United States Patent [19]

Brandolino

[11] Patent Number: 5,711,252
[45] Date of Patent: Jan. 27, 1998

[54] PET BATH APPARATUS

[76] Inventor: Lanae Brandolino, 2004 Shipway Ave., Long Beach, Calif. 90815

[21] Appl. No.: 570,126

[22] Filed: Dec. 11, 1995

[51] Int. Cl.$^6$ .................................................. A01K 13/00
[52] U.S. Cl. ............................ 119/673; 119/478; 119/512
[58] Field of Search ............................ 119/512, 671, 119/673, 676, 498, 474, 166, 168, 513; 190/21, 22 R, 107

[56] References Cited

U.S. PATENT DOCUMENTS

| | | | |
|---|---|---|---|
| D. 282,498 | 2/1986 | Hasse | D30/99 |
| D. 317,371 | 6/1991 | Haffner | D30/158 |
| 436,657 | 9/1890 | Green | 190/21 |
| 517,841 | 4/1894 | Clemens | 190/21 |
| 2,768,719 | 10/1956 | Samuel | 190/107 |
| 3,890,932 | 6/1975 | Sanzone et al. | 119/498 |
| 4,407,234 | 10/1983 | Kleman | 119/672 |
| 4,590,885 | 5/1986 | Sugiura | 119/498 |
| 4,730,576 | 3/1988 | Yoshikawa | 119/673 |
| 4,807,808 | 2/1989 | Reed | 119/498 |
| 4,930,453 | 6/1990 | Laliberte | 119/671 |
| 4,987,860 | 1/1991 | Davis | 119/671 |
| 5,148,771 | 9/1992 | Schuett et al. | 119/671 |
| 5,448,966 | 9/1995 | McKinnon et al. | 119/676 |

FOREIGN PATENT DOCUMENTS

| | | | |
|---|---|---|---|
| 2673357 | 9/1992 | France | 119/498 |

*Primary Examiner*—Edgar S. Burr
*Assistant Examiner*—Amanda B. Sandusky

[57] ABSTRACT

A pet bath apparatus includes a sloped floor unit which includes an elevated portion, a lower portion, and a drain portion located in the lower portion. A set of support legs project downward from the sloped floor unit. A pair of end wall units and a pair of side wall units are supported by the sloped floor unit. Connector assemblies are supported by the wall units and selectively connect adjacent wall units together. The sloped floor unit includes an elevated midportion and two lower portions sloping downward from the elevated mid-portion. The drain portion includes a plurality of drain apertures. The sloped floor unit includes a pair of support ridges projecting upward from side portions of the sloped floor unit, and each side wall unit includes a flange portion projecting outward from an inside side wall surface and in engagement with a support ridge. Each side wall unit includes a pair of alignment-pin-receiving elements which project outward from end portions of the inside side wall surfaces. Each end wall unit includes a pair of alignment pins which project outward from inside wall surfaces of the end wall units. Each connector assembly includes elastic cords which are connected to cord receivers on each of the side wall units. A screen assembly, to catch pet hair, can be placed over drain apertures of the sloped floor unit. A riser assembly can be placed under the sloped floor unit and receive the support legs.

15 Claims, 4 Drawing Sheets

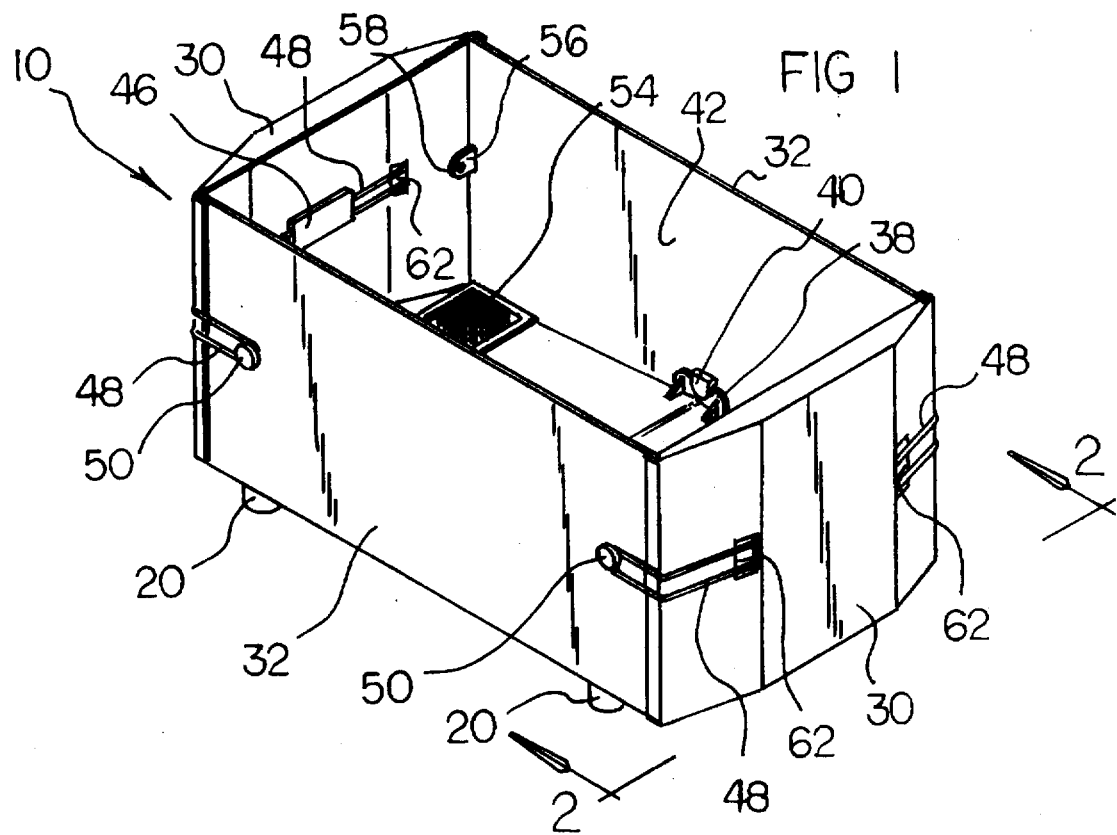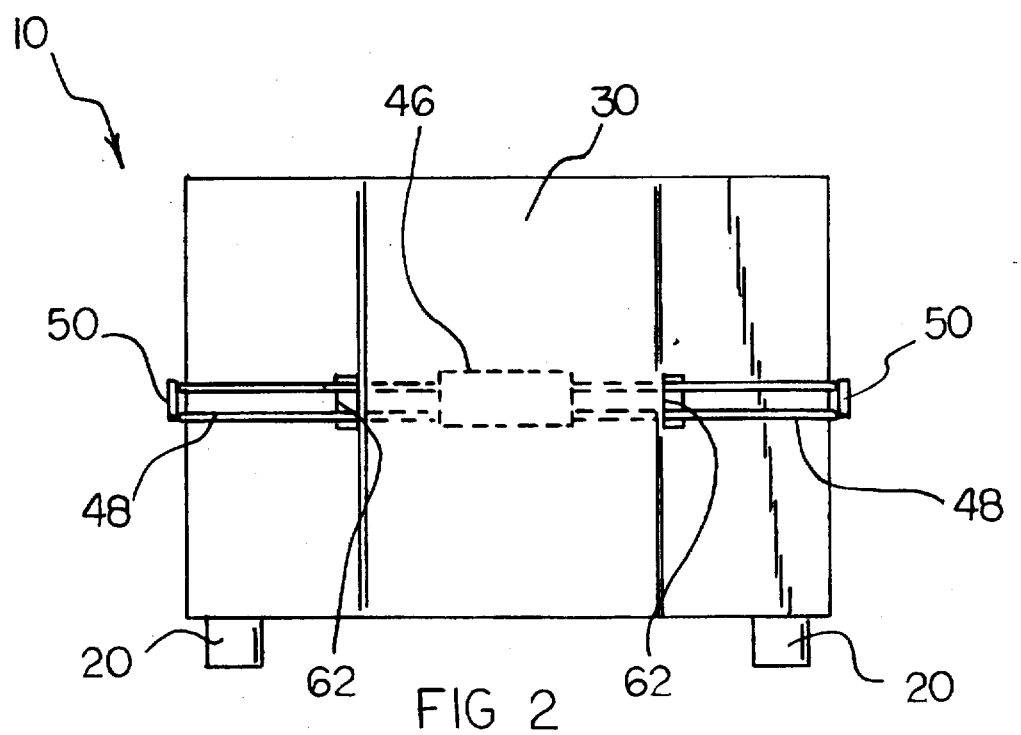

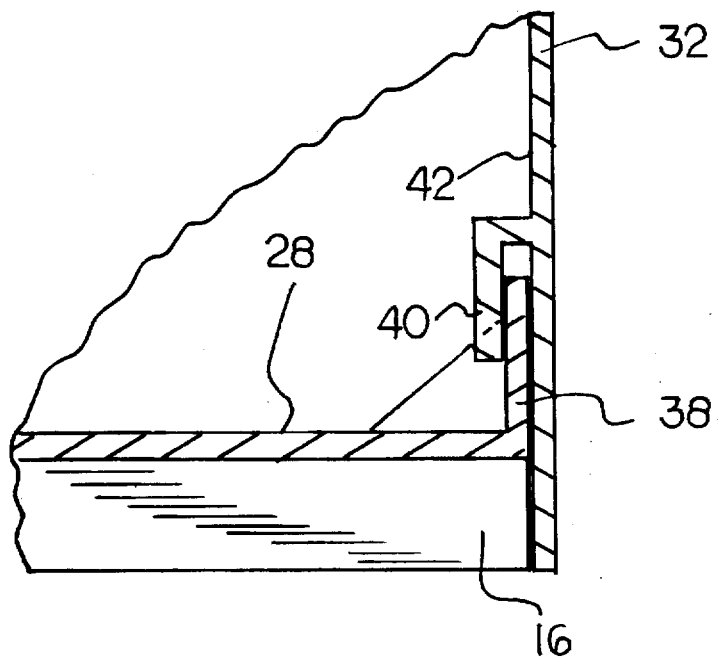
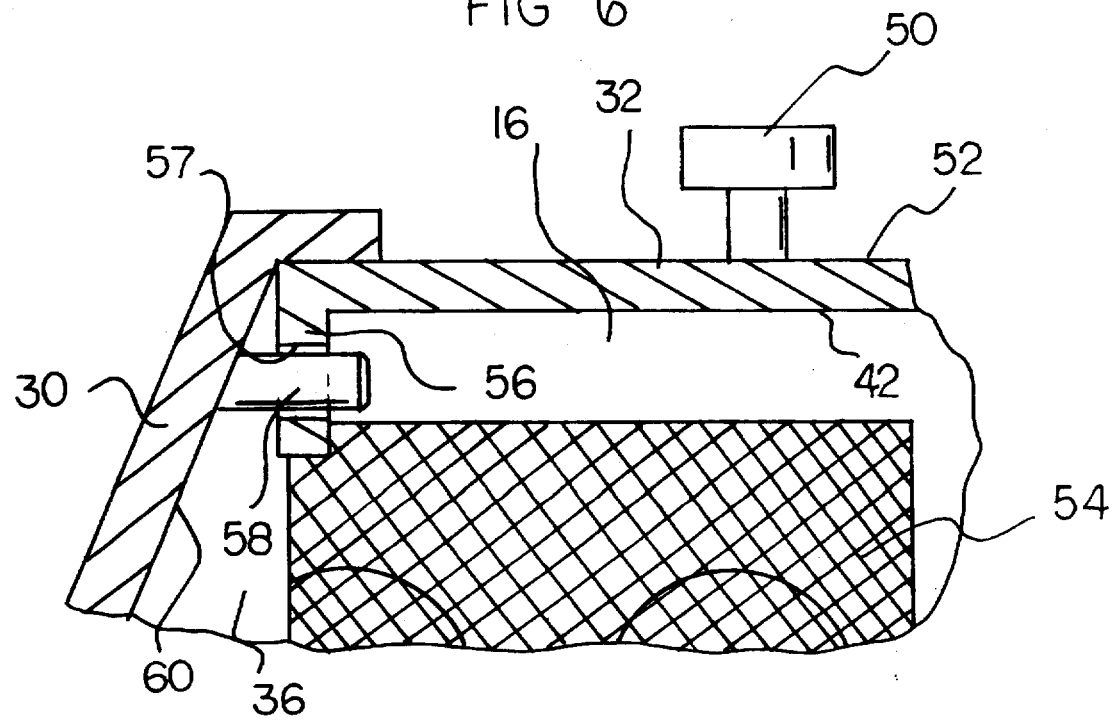

PET BATH APPARATUS

BACKGROUND OF THE INVENTION

1. Field of the Invention

The present invention relates generally to enclosures for holding a pet and, more particularly, to pet enclosures especially adapted for holding a pet while giving the pet a bath.

2. Description of the Prior Art

Pets, especially dogs, should be bathed periodically. A number of options are available to a pet owner for bathing the pet. The pet owner can take the pet to a pet salon. This may be relatively expensive and inconvenient. In this respect, it would be desirable if a device were provided which facilitates a pet owner giving the pet a bath without taking the pet to a pet salon.

To bath a pet at home, the pet owner can place the pet in a bath tub designed for human use. However, there are a number of disadvantages in using a bath tub designed for human use for bathing a pet. A bath tub is often in a bathroom, and many pets are reluctant to voluntarily go into a bathroom. Pets often shed large quantities of pet hair during a bath. Such pet hair can readily clog the drain for the bath tub. The quantity of dirt on a pet is often very much greater than the quantity of dirt normally present on a human. As a result, when a bath tub is used for bathing a pet, the bath tub is often made very dirty. Consequently, the bath tub should be thoroughly cleaned after using the bath tub for bathing the pet. For the reasons set forth above, it would be desirable if a device were provided which enables a pet to be bathed without using a bath tub designed for human use.

In mild weather, pets are often bathed outdoors. For a pet that doesn't like the bathing process, it is often very easy for the pet to escape and run away from the bath. In this respect, it would be desirable if a device were provided which enables bathing a pet outdoors and prevents the pet from running away from the bath.

Although bathed periodically, pets are not often bathed very frequently. As a result, any device that is employed for bathing a pet will be idle for extended periods of time. Having such a device consume quite a bit of space, even when idle, is not desirable. In this respect, it would be desirable if a device were provided which facilitates bathing of a pet and can be readily disassembled for economical use of space during storage.

Even when a pet is bathed outdoors, large quantifies of shed pet hair can be an unwanted addition to the outdoor environment. In this respect, it would be desirable if a device were provided which collects shed pet hair when the pet is bathed outdoors.

When Water falls on a floor, if the floor is not sloped downward, the water can pool into puddles. This is undesirable for a number of reasons. Dirt can accumulate in the puddles. In addition, when a pet moves around, splashing can occur from the puddles. In this respect, it would be desirable if a device were provided for bathing a pet which prevents the formation of puddles on the floor of the device.

To provide adequate drainage, when a device is used for bathing a pet, it would be desirable for the device to be elevated above the ground. To provide proper drainage, the device need be elevated only a short distance above the ground. However, many persons find it inconvenient to bend down on hands and knees to bath a pet. Instead, many persons prefer to bathe their pets with the pet being supported at an above the knee level. In this respect, it would be desirable if a device were provided which enables a pet bath to be elevated to an above the knee level.

Since a pet bathing device is exposed to water, it would be desirable if the pet bathing device were made of materials that do not rest.

Thus, while the bathing of pets is a well known chore, there currently is no pet bathing device which has the following combination of desirable features: (1) facilitates a pet owner giving the pet a bath without taking the pet to a pet salon; (2) if desired, may be used as a liner enabling a pet to be bathed indoors in conjunction with a conventional bath tub or shower stall designed for human use; (3) enables bathing a pet outdoors and prevents the pet from running away from the bath; (4) can be readily disassembled for economical use of space during storage; (5) collects shed pet hair when the pet is bathed; (6) prevents the formation of puddles on the floor of the device; (7) is elevated above the ground; (8) enables a pet bath to be elevated to an above the knee level; and (9) is made from materials that do not rust. The foregoing desired characteristics are provided by the unique pet bath apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a pet bath apparatus which includes a sloped floor unit which includes an elevated portion, a lower portion, and a drain portion located in the lower portion. A set of support legs project downward from a bottom side of the sloped floor unit. A set of four wall units are supported by the sloped floor unit. Connector assemblies, supported by the wall units, are provided for selectively connecting adjacent wall units together. The sloped floor unit includes an elevated midportion and two lower portions sloping downward from the elevated mid-portion. The drain portion includes a plurality of drain apertures. The set of wall units includes a pair of end wall units, wherein each end wall unit is supported by an end portion of the sloped floor unit. The set of wall units also includes a pair of side wall units, wherein each side wall unit is supported by a side portion of the sloped floor unit. Each end wall unit includes a transverse ledge for resting on an end portion of the sloped floor unit. Each end wall unit has a concave shape with the transverse ledge extending from one edge to another of the concave shape.

The sloped floor unit includes a pair of support ridges projecting upward from side portions of the sloped floor unit, and each side wall unit includes a flange portion projecting outward from an inside side wall surface. The flange portion is placed in registration with one of the support ridges on the sloped floor unit. Each end wall unit includes a pair of side slots for receiving end portions of the side wall units. Each side wall unit includes a pair of alignment-pin-receiving elements which project outward from end portions of the inside side wall surfaces. Each end wall unit includes a pair of alignment pins which project outward from inside wall surfaces of the end wall units.

Each connector assembly includes a cord-support bracket attached to an end wall unit. A pair of cords are supported by the cord-support bracket, and a pair of cord receivers are connected to each of the side wall units. The cords are made from elastic material. The end wall units includes cord-passage apertures which permit cords to pass through the end wall units. The cord receivers are located on outside side wall surfaces of the side wall units. A screen assembly can be placed over drain apertures of the sloped floor unit.

A riser assembly can be placed under the sloped floor unit. The riser assembly includes a set of foot-receiving elements for receiving the support legs which project downward from the sloped floor unit. A set of riser legs supports the foot-receiving elements, and a transverse strut assembly maintains the riser legs in vertical orientations. The support legs on the sloped floor unit are cylindrical in shape, and the foot-receiving elements of the riser assembly are complimentary shaped cylindrical cups which receive the support legs.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto. In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pet bath apparatus which has all of the advantages of the prior art and none of the disadvantages.

It is another object of the present invention to provide a new and improved pet bath apparatus which may be easily and efficiently manufactured and marketed.

It is a further object of the present invention to provide a new and improved pet bath apparatus which is of durable and reliable construction.

An even further object of the present invention is to provide a new and improved pet bath apparatus which is susceptable of a low cost of manufacture with regard to both materials and labor, and which accordingly is then susceptable of low prices of sale to the consuming public, thereby making such pet bath apparatus available to the buying public.

Still yet a further object of the present invention is to provide a new and improved pet bath apparatus which facilitates a pet owner giving the pet a bath without taking the pet to a pet salon.

Still another object of the present invention is to provide a new and improved pet bath apparatus that, if desired, may be used indoors as a liner in a conventional bath tub or shower stall designed for human use.

Yet another object of the present invention is to provide a new and improved pet bath apparatus which enables bathing a pet outdoors and prevents the pet from running away from the bath.

Even another object of the present invention is to provide a new and improved pet bath apparatus that can be readily disassembled for economical use of space during storage.

Still a further object of the present invention is to provide a new and improved pet bath apparatus which collects shed pet hair when the pet is bathed.

Yet another object of the present invention is to provide a new and improved pet bath apparatus that prevents the formation of puddles on the floor of the device.

Still another object of the present invention is to provide a new and improved pet bath apparatus which is elevated above the ground.

Yet another object of the present invention is to provide a new and improved pet bath apparatus that enables a pet bath to be elevated to an above the knee level.

Still a further object of the present invention is to provide a new and improved pet bath apparatus that is made from materials that do not rust.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a preferred embodiment of the pet bath apparatus of the invention fully assembled.

FIG. 2 is an enlarged front view of the embodiment of the pet bath apparatus shown in FIG. 1 taken along line 2—2 of FIG. 1.

FIG. 5 is an enlarged cross-sectional view of the portion of the embodiment of the invention shown in FIG. 3 taken along line 5—5 thereof.

FIG. 6 is an enlarged cross-sectional view of the portion of the embodiment of the invention shown in FIG. 4 taken along line 6—6 thereof.

DESCRIPTION OF THE PREFERRED EMBODIMENT

Figure 3:
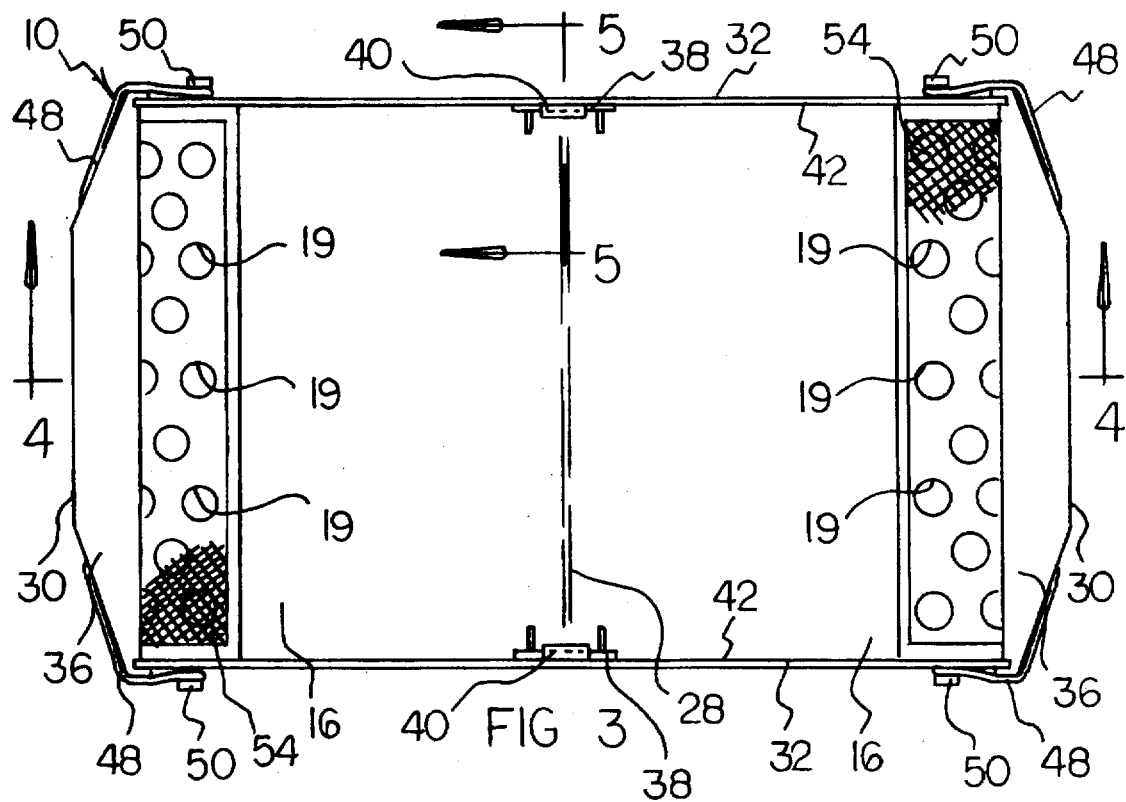
FIG. 3 is an enlarged top view of the embodiment of the pet bath apparatus of FIG. 1.
Figure 4:
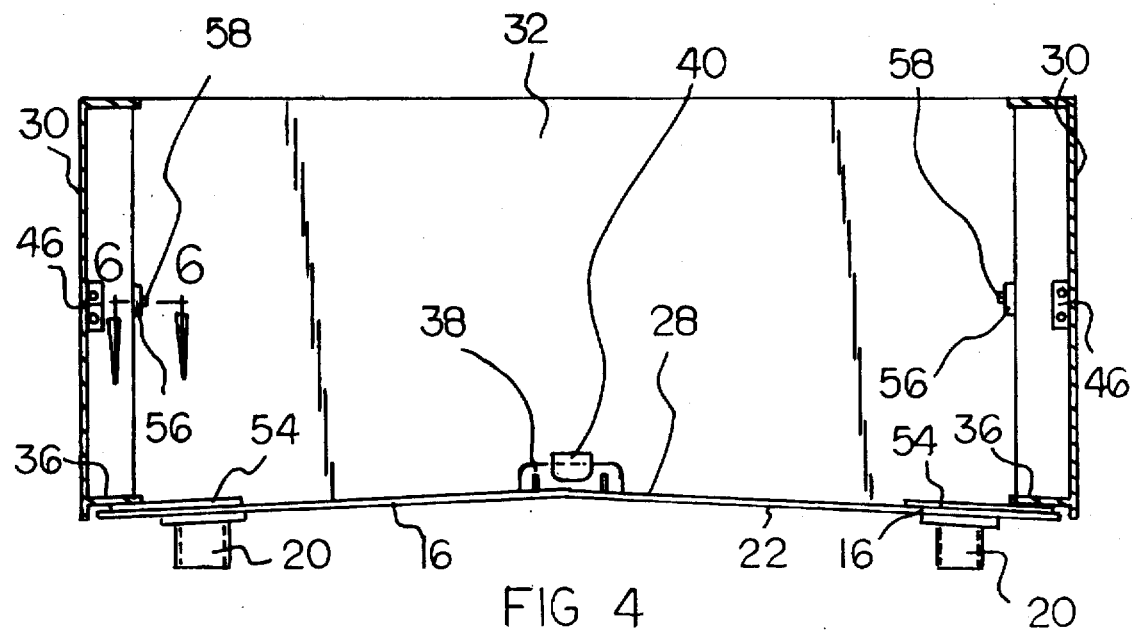
FIG. 4 is a cross-sectional view of the embodiment of the invention shown in FIG. 3 taken along line 4—4 thereof.

With reference to the drawings, a new and improved pet bath apparatus embodying the principles and concepts of the present invention will be described.

Turning to FIGS. 1–7, there is shown an exemplary embodiment of the pet bath apparatus of the invention generally designated by reference numeral 10. In its preferred form, pet bath apparatus 10 includes a sloped floor unit 12 which includes an elevated portion, a lower portion 16, and a drain portion located in the lower portion 16. A set of support legs 20 project downward from a bottom side 22 of the sloped floor unit 12. A set of four wall units are supported by the sloped floor unit 12. Connector assemblies, supported by the wall units, are provided for selectively connecting adjacent wall units together. The sloped floor unit 12 includes an elevated mid-portion 28 and two lower portions 16 sloping downward from the elevated mid-portion 28. The drain portion includes a plurality of drain apertures 19. The set of wall units includes a pair of end wall units 30, wherein each end wall unit 30 is supported by an end portion of the sloped floor unit 12. The set of wall units also includes a pair of side wall units 32, wherein each side wall unit 32 is supported by a side portion of the sloped floor unit 12. Each end wall unit 30 includes a transverse ledge 36 for resting on an end portion of the sloped floor unit 12. Each end wall unit 30 has a concave shape with the transverse ledge 36 extending from one edge to another of the concave shape.

The sloped floor unit 12 includes a pair of support ridges 38 projecting upward from side portions of the sloped floor unit 12, and each side wall unit 32 includes a flange portion 40 projecting outward from an inside side wall surface 42. The flange portion 40 is placed in registration with one of the support ridges 38 on the sloped floor unit 12. Each end wall unit 30 includes a pair of side slots 44 for receiving end portions of the side wall units 32. Each side wall unit 32 includes a pair of alignment-pin-receiving elements 56 which project outward from end portions of the inside side wall surfaces 42. Each end wall unit 30 includes a pair of alignment pins 58 which project outward from inside wall surfaces 60 of the end wall units 30.

Each connector assembly includes a cord-support bracket 46 attached to an end wall unit 30. A pair of cords 48 are supported by the cord-support bracket 46, and a pair of cord receivers 50 are connected to each of the side wall units 32.

The cords 48 are made from elastic material. Preferably, the cords 48 are made from elastic "bungee" cords. The cords 48 can also be made from other cord materials such as nylon rope. As shown in the drawings, the cords 48 are in the form of loops that are placed around the cord receivers 50 on the side wall units 32. Alternatively, pairs of cords can be used and tied around the cord receivers 50 on the side wall units 32. The end wall units 30 includes cord-passage apertures 62 which permit cords 48 to pass through the end wall units 30. The cord receivers 50 are located on outside side wall surfaces 52 of the side wall units 32.

A screen assembly 54 can be placed over drain apertures 19 of the sloped floor unit 12. The screen assembly 54 has a mesh sufficiently small to trap the majority of pet hairs. The mesh is sufficiently large to permit adequate drainage through the drain apertures 19 to prevent puddle formation on the sloped floor unit 12. A mesh of screen commonly used for window screens is satisfactory. Two screen assemblies 54 are employed, one for each end of the sloped floor unit 12.

Figure 7:
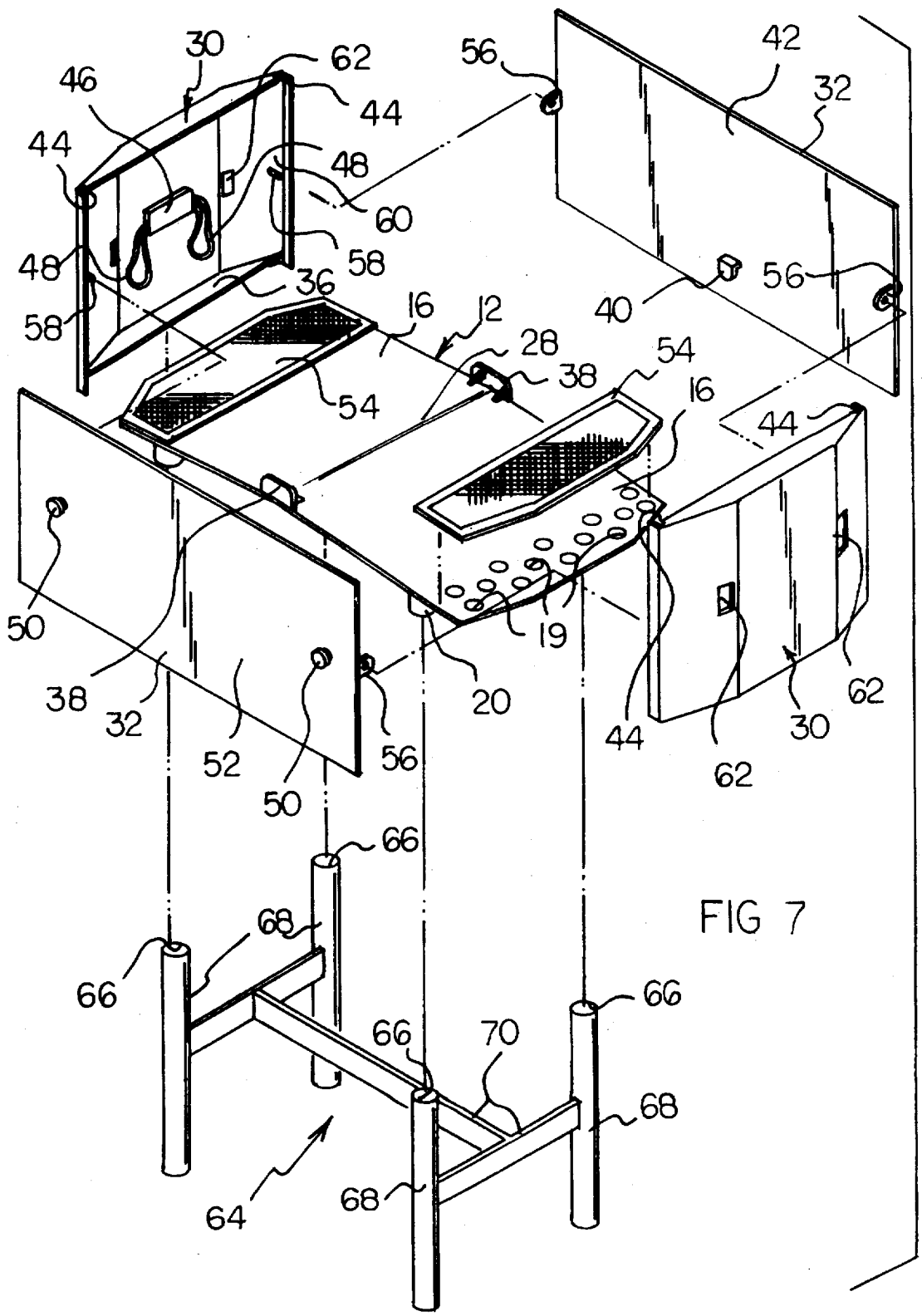
FIG. 7 is an exploded view of the embodiment of the invention shown in FIG. 1 with the further addition of a riser assembly for supporting the pet bath apparatus at an above the knee position.

A riser assembly 64, as shown in FIG. 7, can be placed under the sloped floor unit 12. The riser assembly 64 includes a set of foot-receiving elements 66 for receiving the support legs 20 which project downward from the sloped floor unit 12. A set of riser legs 68 supports the foot-receiving elements 66, and a transverse strut assembly 70 maintains the riser legs 68 in vertical orientations. The height of the riser legs 68 is selected to that when the sloped floor unit 12 is supported by the riser assembly 64, a pet (not shown) is supported by the sloped floor unit 12 in an above-the-knee position. The support legs 20 on the sloped floor unit 12 are cylindrical in shape, and the foot-receiving elements 66 of the riser assembly 64 are complimentary shaped cylindrical cups which receive the support legs 20.

To use the pet bath apparatus 10 of the invention, the apparatus must first be assembled from the parts that are kept in storage. To do so, the sloped floor unit 12 is first placed on the ground, floor with a drain, or other suitable horizontal surface. A transverse ledge 36 of one of the end wall units 30 is placed on an end portion of a lower portion 16 of the sloped floor unit 12. A side wall unit 32 is guided so that the flange portion 40 of the side wall unit 32 engages a support ridge 38 on the sloped floor unit 12. In addition, an alignment-pin-receiving element 56 on the side wall unit 32 is guided so that an alignment pin 58 on the end wall unit 30 moves through the guide aperture 57 in the alignment-pin-receiving element 56. In addition, a leading edge of the side wall unit 32 is guided into a side slot 44 in the end wall unit 30. Then, one of the elastic cords 48 is passed through a cord-passage aperture 62 in the end wall unit 30, and the cords 48 is attached to a cord receiver 50 on the side wall unit 32.

Once one side wall unit 32 is connected to the sloped floor unit 12 and once one end of that side wall unit 32 is attached to one end of a end wall unit 30 as described above, then a second side wall unit 32 is attached to the sloped floor unit 12 and the other end of the end wall unit 30 in a similar way. Then, the transverse ledge 36 of the other end wall unit 30 is placed on the opposite end of the sloped floor unit 12. This is done in such a way that ends of each of the side wall units 32 is guided into the side slots 44 in the end wall unit 30, and this is done in such a way that the alignment pins 58 in the end wall unit 30 are passed through the guide apertures 57 in the alignment-pin-receiving elements 56 of the side wall units 32. Then, the ends of the elastic cords 48 are passed through the cord-passage apertures 62 in the end wall unit 30, and the elastic cords 48 are attached to the free cord receivers 50 on the side wall units 32.

After the procedure set forth above has been followed, the pet bath apparatus 10 has been assembled. The basic pet bath apparatus 10 has a floor and four walls. The screen assemblies 54 can then be placed to cover the drain apertures 19 in the sloped floor unit 12. In addition, optionally, the support legs 20 projecting from the sloped floor unit 12 can be placed in the foot-receiving cups 66 of the riser assembly 64 so that the pet bath apparatus 10 is located above the knees of the person who will give the pet a bath.

A four-legged pet is placed on the sloped floor unit 12. One set of the pet's legs is placed on one side of the elevated mid-portion 28 of the sloped floor unit 12, and the other set of the pet's legs are placed on the other side of the elevated mid-portion 28. In essence, each end of the pet has is own sloping floor portion, its own drain apertures 19, and its own screen assembly 54. When the bath is over, the elastic cords 48 are removed from the cord receivers 50, the end wall units 30 are pulled away from the side wall units 32 and the sloped floor unit 12, and the side wall units 32 are lifted off of the support ridges 38 on the sloped floor unit 12. If a riser assembly 64 is also employed, the support legs 20 on the sloped floor unit 12 are lifted out from the foot-receiving cups 66 on the riser assembly 64. The disassembled components can be stored in a storage space that takes up a relatively small volume of storage space.

It is further noted that the pet bath apparatus 10 of the invention can be used in a dry environment as a portable, collapsible pet pen.

The components of the pet bath apparatus of the invention can be made from inexpensive and durable non-rusting metal, such as aluminum, and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved pet bath apparatus that is low in cost, relatively simple in design and operation, and which may advantageously be used to facilitate a pet owner to give the pet a bath without taking the pet to a pet salon. With the invention, a pet bath apparatus is provided which, if desired, may conveniently be used indoors preferably by placing the apparatus in a water confining environment such as for example, in a conventional bath tub (or shower stall) designed for human use. With the invention, a pet bath apparatus is provided which enables bathing a pet indoors or outdoors and prevents the pet from running away from the bath. With the invention, a pet bath apparatus is provided which can be readily disassembled for economical use of space during storage. With the invention, a pet bath apparatus is provided which collects shed pet hair when the pet is bathed. With the invention, a pet bath apparatus is provided which prevents the formation of puddles on the floor of the device. With the invention, a pet bath apparatus is provided which is elevated above the ground. With the invention, a pet bath apparatus is provided which enables a pet bath to be elevated to an above the knee level. With the invention, a pet bath apparatus is provided which is made from materials that do not rust.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification. Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A pet bath apparatus, comprising:
    a sloped floor unit which includes an elevated portion, a lower portion, and a drain portion located in said lower portion,
    a set of support legs projecting downward from a bottom side of said sloped floor unit,
    set of four wall units supported by said sloped floor unit, and
    connector assemblies, supported by said wall units, for selectively connecting said set of wall units together;
    wherein said set of wall units includes:
        a pair of end wall units, wherein each end wall unit is supported by an end portion of said sloped floor unit, and
        a pair of side wall units, wherein each side wall unit is supported by a side portion of said sloped floor unit,
        wherein each end wall unit includes a transverse ledge for resting on an end portion of said sloped floor unit,
        wherein each end wall unit has a concave shape with said transverse ledge extending from one edge to another of said concave shape.

2. The apparatus of claim 1 wherein said sloped floor unit includes an elevated mid-portion and two lower portions sloping downward from said elevated mid-portion.

3. The apparatus of claim 1 wherein said drain portion includes a plurality of drain apertures.

4. The apparatus of claim 1 wherein:
    said sloped floor unit includes a pair of support ridges projecting upward from side portions of said sloped floor unit, and
    each side wall unit includes a flange portion projecting outward from an inside side wall surface, wherein said flange portion is placed in registration with one of said support ridges on said sloped floor unit.

5. The apparatus of claim 1 wherein each end wall unit includes a pair of side slots for receiving end portions of said side wall units.

6. The apparatus of claim 1 wherein:
    each side wall unit includes a pair of alignment-pin-receiving elements which project outward from end portions of inside side wall surfaces, and
    each end wall unit includes a pair of alignment pins which project outward from inside wall surfaces of said end wall units.

7. The apparatus of claim 1, further including:
    a screen assembly for placement over said drain apertures of said sloped floor unit.

8. The apparatus of claim 1, further including: a riser assembly for placement under said sloped floor unit.

9. The apparatus of claim 8 wherein said riser assembly includes:
    a set of foot-receiving elements for receiving said support legs which project downward from said sloped floor unit,
    a set of riser legs which support said foot-receiving elements, and
    a transverse strut assembly for maintaining said riser legs in vertical orientations.

10. The apparatus of claim 9 wherein said support legs on said sloped floor unit are cylindrical in shaped and said foot-receiving elements of said riser assembly are complimentary shaped cylindrical cups.

11. The apparatus of claim 10 wherein said foot-receiving elements are cups which receive said support legs.

12. A pet bath apparatus, comprising:
    a sloped floor unit which includes an elevated portion, a lower portion, and a drain portion located in said lower portion,
    a set of support legs projecting downward from a bottom side of said sloped floor unit,
    set of four wall units supported by said sloped floor unit, and connector assemblies, supported by said wall units, for selectively connecting said set of wall units together, wherein said set of wall units includes:
a pair of end wall units, wherein each end wall unit is supported by an end portion of said sloped floor unit, and
a pair of side wall units, wherein each side wall unit is supported by a side portion of said sloped floor unit; and wherein each connector assembly includes:
a cord-support bracket attached to an end wall unit,
a pair of cords supported by said cord-support bracket, and
a pair of cord receivers connected to each of said side wall units.

13. The apparatus of claim 12 wherein said cords are made from elastic material.

14. The apparatus of claim 12 wherein said end wall units include cord-passage apertures which permit cords to pass through said end wall units.

15. The apparatus of claim 12 whereto said cord receivers are located on outside side wall surfaces of said side wall units.

* * * * *